(12) United States Patent
Chellapilla et al.

(10) Patent No.: US 7,664,323 B2
(45) Date of Patent: Feb. 16, 2010

(54) SCALABLE HASH-BASED CHARACTER RECOGNITION

(75) Inventors: Kumar H. Chellapilla, Sammamish, WA (US); Patrice Y. Simard, Bellevue, WA (US); Radoslav Petrov Nickolov, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 621 days.

(21) Appl. No.: 11/045,792

(22) Filed: Jan. 28, 2005

(65) Prior Publication Data

US 2006/0171588 A1 Aug. 3, 2006

(51) Int. Cl.
*G06K 9/00* (2006.01)
(52) U.S. Cl. ............... 382/181; 382/187; 382/209; 382/306; 704/10; 703/3; 717/170
(58) Field of Classification Search ............ 382/181, 382/187, 209, 306; 704/10; 703/3; 717/170
See application file for complete search history.

(56) References Cited

U.S. PATENT DOCUMENTS

| 5,392,363 | A * | 2/1995 | Fujisaki et al. ............. 382/187 |
| 5,469,354 | A * | 11/1995 | Hatakeyama et al. ........... 707/3 |
| 6,621,941 | B1 * | 9/2003 | Syeda-Mahmood et al. . 382/306 |
| 7,124,408 | B1 * | 10/2006 | Parthasarathy et al. ...... 717/170 |
| 2002/0123882 | A1 * | 9/2002 | Mohammed ................. 704/10 |
| 2003/0113021 | A1 * | 6/2003 | Shiotani ..................... 382/209 |
| 2003/0193994 | A1 * | 10/2003 | Stickler ...................... 375/150 |
| 2004/0101198 | A1 * | 5/2004 | Barbara ..................... 382/181 |
| 2005/0198468 | A1 * | 9/2005 | Rubin et al. ................. 712/22 |
| 2006/0005247 | A1 * | 1/2006 | Zhang et al. ................ 726/26 |
| 2006/0112121 | A1 * | 5/2006 | McKenney et al. ......... 707/101 |

OTHER PUBLICATIONS

Thomas H. Cormen, et al., Introduction to Algorithms (MIT Electrical Engineering and Computer Science), 1990, MIT Press.
Benjamin B. Kimia, Shape Representation for Image Retrieval, at Chapter 13 of Image Databases : Search and Retrieval Of Digital Imagery, Editor(s): Vittorio Castelli, Lawrence D. Bergman, Apr. 2002, John Wiley & Sons.

(Continued)

*Primary Examiner*—Daniel G Mariam
*Assistant Examiner*—Aklilu K Woldemariam
(74) *Attorney, Agent, or Firm*—Lee & Hayes, PLLC

(57) ABSTRACT

The subject invention leverages a scalable character glyph hash table to provide an efficient means to identify print characters where the character glyphs are identical over independent presentation. The hash table allows for quick determinations of glyph meta data as, for example, a pre-filter to traditional OCR techniques. The hash table can be trained for a particular environment, user, language, character set (e.g., alphabet), document type, and/or specific document and the like. This permits substantial flexibility and increases in speed in identifying unknown glyphs. The hash table itself can be composed of single or multiple tables that have a specific optimization purpose. In one instance of the subject invention, traditional OCR techniques can be utilized to update the hash tables as needed based on glyph frequency. This keeps the hash tables from growing by limiting updates that reduce its performance, while adding frequently determined glyphs to increase the pre-filter performance.

18 Claims, 10 Drawing Sheets

OTHER PUBLICATIONS

Manuel J. Fonseca, et al., Retrieving ClipArt Images by Content, International Conference on Image and Video Retrieval (CIVR'04), Jul. 2004, Dublin, Ireland.

E.G. M. Petrakis, et al., Similarity Searching in Large Image Databases, 1995, Technical Report 3388, Department of Computer Science, University of Maryland.

B. Kaliski, RFC 1319—The MD2 Message-Digest Algorithm, Apr. 1992, RSA Data Security, Inc.

R. Rivest, RFC 1320—The MD4 Message-Digest Algorithm, Apr. 1992, MIT Laboratory for Computer Science and RSA Data Security, Inc.

R. Rivest, RFC 1321—The MD5 Message-Digest Algorithm, Apr. 1992, MIT Laboratory for Computer Science and RSA Data Security, Inc.

D. Eastlake, 3rd, et al., RFC 3174—US Secure Hash Algorithm 1 (SHA1), Sep. 2001, Motorola (Eastlake) and Cisco Systems (Jones).

* cited by examiner

SCALABLE HASH-BASED CHARACTER RECOGNITION

TECHNICAL FIELD

The subject invention relates generally to data recognition, and more particularly to scalable, hash-based universal systems and methods for recognizing unknown character glyphs.

BACKGROUND OF THE INVENTION

Every day people become more dependent on computers to help with both work and leisure activities. Computers are especially becoming vital as a communication means, especially for written communications. Humans tend to communicate in an analog manner such as writing letters. However, computers operate in a digital domain that requires discrete states to be identified in order for information to be processed. This presents some technological issues that must be overcome when interfacing with analog based entities such as human beings. Thus, information is generally converted into "ones" and "zeroes" or "digitized" so that computing systems can recognize analog-based items and process them accordingly.

To facilitate this conversion requirement, people have been trained on devices that easily convert analog thoughts into digital information such as via typewriters, keyboards, and other discrete based devices. These means typically produce a somewhat consistently formatted product to enhance readability. To convert these products into the digital realm, they are typically scanned (converted to digital quantities) into a computing system so that the information can be stored. If the information is to be recognized by the system, it is typically processed further so that the "image" of the information is broken down into discrete recognizable parts. For example, a typewritten page can be scanned into a computer to form an image of the page. It can then be further processed so that it is broken down into individual symbols or "glyphs" that are then identified or "labeled" such that the computing system 'recognizes' the symbol.

As background, technology first focused on inputting existing printed or typeset information into computers. Scanners or optical imagers were utilized, at first, to digitize pictures (e.g., input images into a computing system). Once images could be digitized into a computing system, it followed that printed or typeset material should be able to be digitized also. However, an image of a scanned page cannot be manipulated as text or symbols after it is brought into a computing system because it is not "recognized" by the system, i.e., the system does not understand the page. The characters and words are "pictures" and not actually editable text or symbols.

To overcome this limitation for text, optical character recognition (OCR) technology was developed to utilize scanning technology to digitize text as an editable page. This technology worked reasonably well if a particular text font was utilized that allowed the OCR software to translate a scanned image into editable text. One of the problems with this approach is that existing OCR technology is tuned to recognize limited or finite choices of possible types of fonts in a linear sequence (i.e., a line of text). Thus, it could "recognize" a character by comparing it to a database of pre-existing fonts. Character recognition is not limited to only scan or fax type character recognition. Computing systems often internally utilize font recognition techniques to facilitate in other functions such as, for example, printing and/or converting documents from one format to another. Increasing the performance of a character recognizer thus has impacts not only on traditional types of character recognition, such as scanning, but also on other system functions as well.

With today's plethora of information, it is impracticable to have a database that contains all pre-existing fonts. If one also stores variants of these fonts, the size of the database can grow even more. Even if a database could contain these fonts, it would be so vast that it would take an extreme amount of processing power and time to identify a symbol in the database. A typical user cannot normally afford to own such computing power nor do they desire to spend hours attempting to establish character recognition. Thus, although OCR technology has made great strides in increasing its accuracy, it has not kept pace in the same manner with reducing processing time. It is also limited in that it requires known or pre-existing font sets to operate efficiently.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates generally to data recognition, and more particularly to scalable, hash-based universal systems and methods for recognizing unknown character glyphs. A character glyph hash table is leveraged to provide an efficient means to identify print characters where the character glyphs are identical over independent presentation. The hash table allows for quick determinations of glyph meta data as, for example, a pre-filter to traditional OCR techniques. The hash table can be trained for a particular environment, user, language, document type, and/or specific document and the like. This permits substantial flexibility and increases in speed in identifying unknown glyphs. The hash table itself can be composed of single or multiple tables that have a specific optimization purpose. In one instance of the subject invention, traditional OCR techniques can be utilized to update the hash tables as needed based on character glyph frequency. This keeps the hash tables from growing too large by limiting updates that reduce its performance, while adding frequently determined glyphs to increase the pre-filter performance. Because the hash tables can be easily trained or "adapted" to various situations, instances of the subject invention provide greater performance in broad and/or specific situations and, thus, provide performance increases regardless of whether glyphs are known and/or unknown to a traditional OCR technique. Thus, the subject invention significantly enhances user satisfaction through substantial increases in speed and accuracy of character glyph recognition.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may

DETAILED DESCRIPTION OF THE INVENTION

Figure 1:
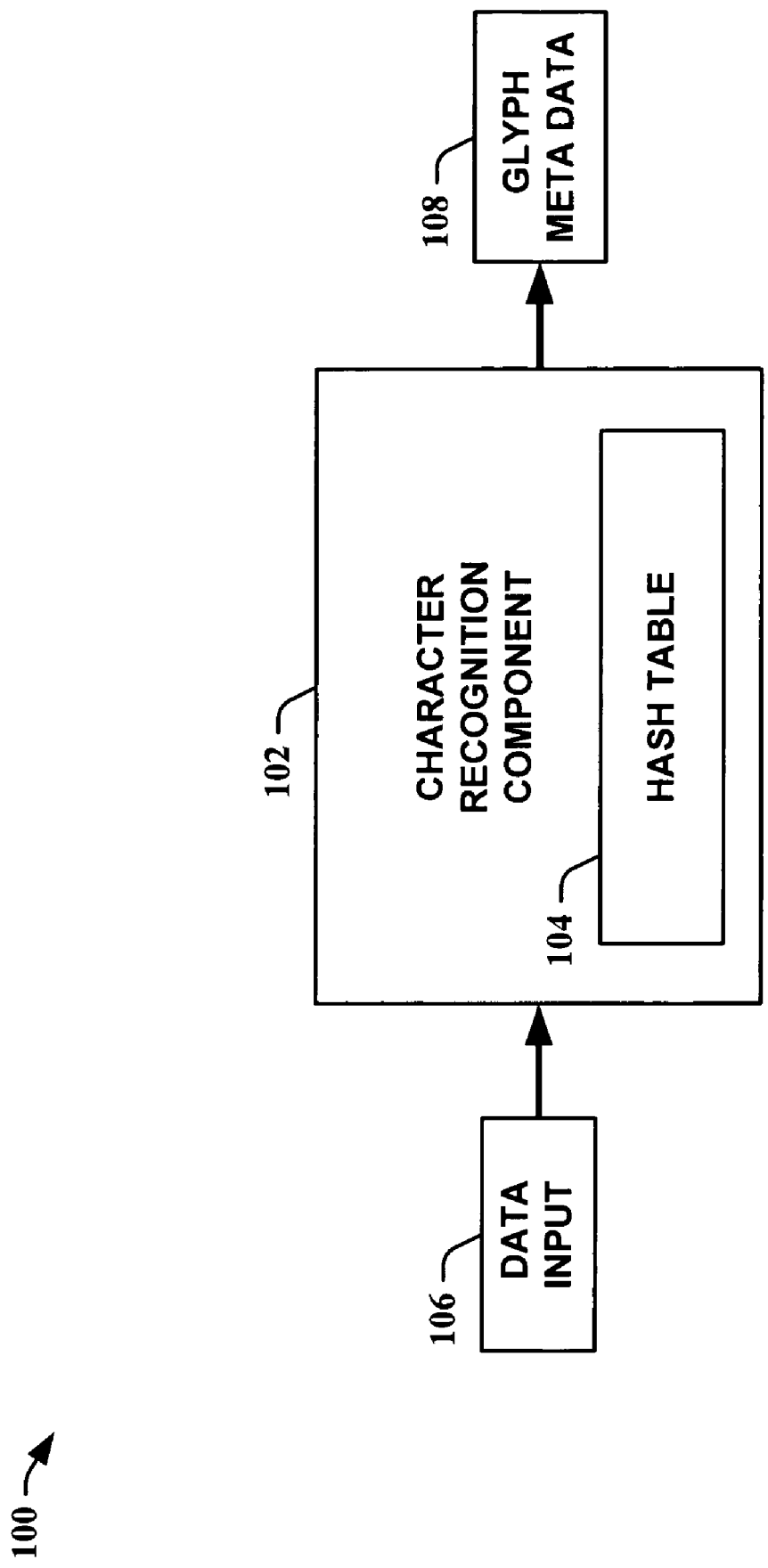
FIG. 1 is a block diagram of a character recognition system in accordance with an aspect of the subject invention.

The subject invention is now described with reference to the drawings, wherein like reference numerals are utilized to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As utilized in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The subject invention provides systems and methods that facilitate in improving optical character recognition through utilization of a hashing approach for recognition of character glyphs to obtain their character code, font size, font name, and/or font attributes and/or any other font and/or character meta data that is of interest. One instance of the subject invention provides a glyph hashing method for hash functions for hashing glyphs in bitmap and can be implemented in a print driver. Instances of the subject invention allow a database of hashes to be compiled to scale, for example, to thousands of fonts, font styles, and/or character sets with several thousand characters and the like. Thus, instances of the subject invention can provide optical character recognition (OCR) of print characters where the character glyphs are identical over independent presentation (as opposed to characters in faxed or scanned documents that contain distortion) and accomplishes this with high accuracy and speed.

More than 90% of the documents in the world are created utilizing similar software. Importing documents into software applications has traditionally relied on custom converters that could read and convert these documents. These converters are time consuming, expensive to build, and are brittle to changes in document formats. Furthermore, converters are typically available only for dissimilar formats. A technology that can enable automated OCR in a low-level print and/or a display driver allows for building an automated document conversion and/or import system that can work with any document that can be printed/viewed. Thus, instances of the subject invention can provide significant savings when building document converters and/or import/export features. Other instances of the subject invention can also be utilized with portable document format (PDF) documents to facilitate in their conversion to word processors.

In FIG. 1, a block diagram of a character recognition system 100 in accordance with an aspect of the subject invention is shown. The character recognition system 100 is comprised of a character recognition component 102 that utilizes a hash table 104. Although the hash table 104 is illustrated within the character recognition component 102, in other instances of the subject invention, the hash table can reside externally to the character recognition component 102. The character recognition component 102 receives a data input 106 that typically contains at least one unknown glyph representation. An "unknown" glyph representation is typically a glyph representation for which a label is not provided with the data input 106. The character recognition component 102 then processes the data input 106 to determine glyph meta data 108 utilizing the hash table 104 to facilitate in the process. Additional instances of the subject invention can also utilize other forms of character recognition to facilitate the hash table utilization when an unknown glyph representation is not identified in the hash table 104. The character recognition component 102 provides 100% accuracy for those glyph representations identifiable from the hash table 104. The data input 106 can include, but is not limited to, compressed, uncompressed, and/or encoded glyph representations. Thus, the subject invention can further facilitate performance since it is unnecessary to take additional time to uncompress data in order to identify it. The glyph representations can also include application programs and the like that generate fonts, etc.

Instances of the subject invention include a trainable character recognition component 102 that learns from a particular "situation" and constructs the hash table 104 accordingly. Situations can include, but are not limited to, specific users, languages, locations, documents, document types, business types, professions, software applications, character sets, and/or computing systems and the like. These instances are adaptable to a given task and/or environment. This allows the subject invention to be a "universal" character recognizer, removing any requirement that the hash table 104 be constructed á priori. Thus, instances of the subject invention can construct the hash table 104 after the fact or á posteriori. The hash table 104 can be comprised of a single hash table and/or multiple hash tables with various forms of permanency and/or location (discussed further infra). The hash table is updatable as well in other instances of the subject invention and a threshold value, for example, a frequency value and/or a relevancy value and the like, can be utilized to facilitate in determining when the hash table 104 is updated.

Figure 2:
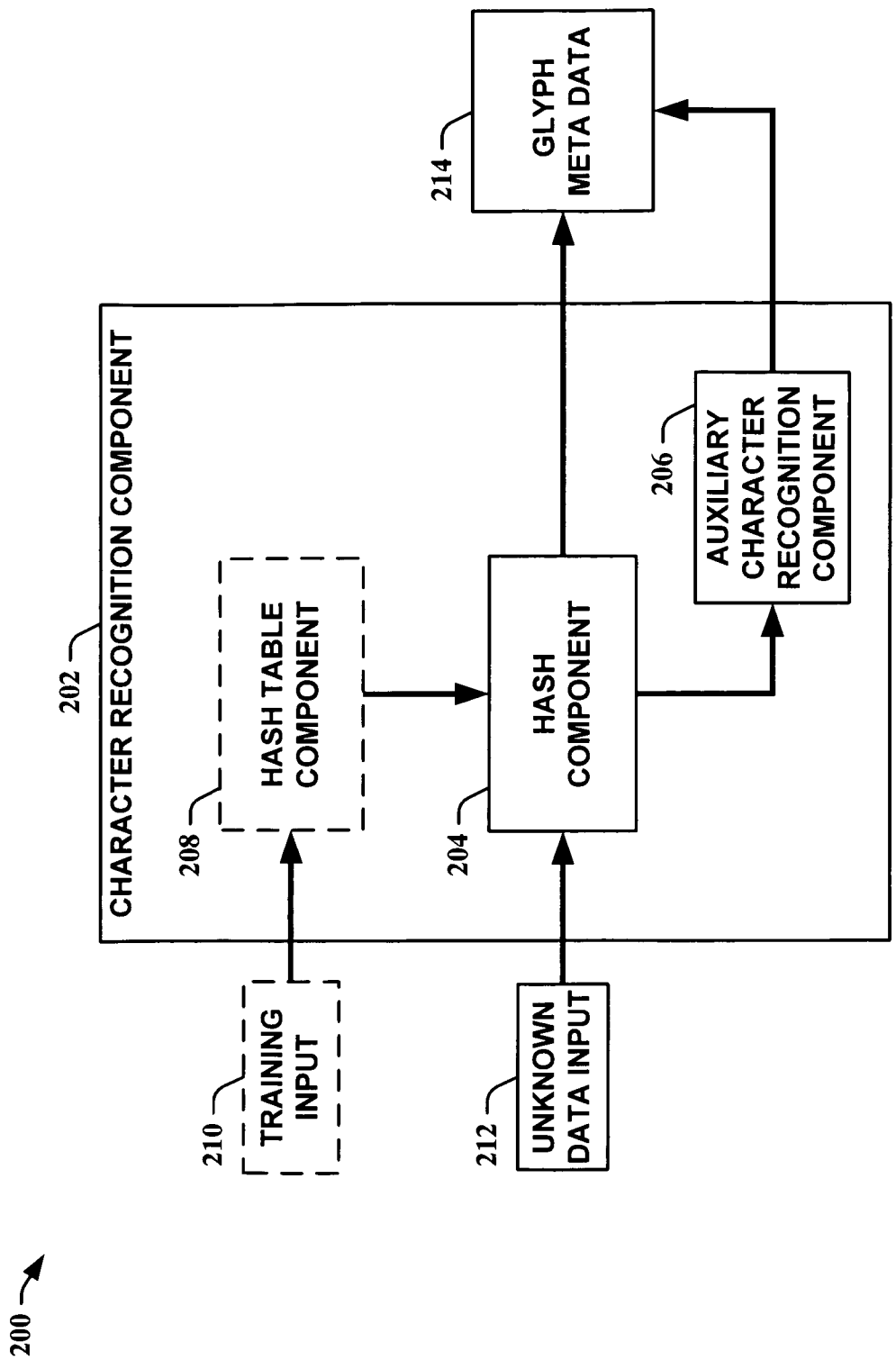
FIG. 2 is another block diagram of a character recognition system in accordance with an aspect of the subject invention.

Referring to FIG. 2, another block diagram of a character recognition system 200 in accordance with an aspect of the subject invention is depicted. The character recognition system 200 is comprised of a character recognition component 202 with a hash component 204, an auxiliary character recognition component 206, and an optional hash table component 208. When the character recognition component 202 includes an optional hash table component 208, it 202 can receive a training input 210. The training input 210 can include, but is not limited to, data such as documents, fonts, and glyph information and the like. The optional hash table component 208 facilitates in constructing a hash table that is utilized by the hash component to facilitate in determining glyph meta data 214 from an unknown data input 212. Construction of the hash table is described in detail infra. The hash component 204 receives the unknown data input 212 and attempts to determine the glyph meta data 214 from the hash table. If the attempt fails, the hash component 204 employs the auxiliary character recognition component 206 to facilitate in determining the glyph meta data 214. The auxiliary character recognition component 206 is typically utilized as a secondary form of character recognition because it is substantially slower in recognizing glyphs and/or has a lower recognition success rate.

Figure 3:
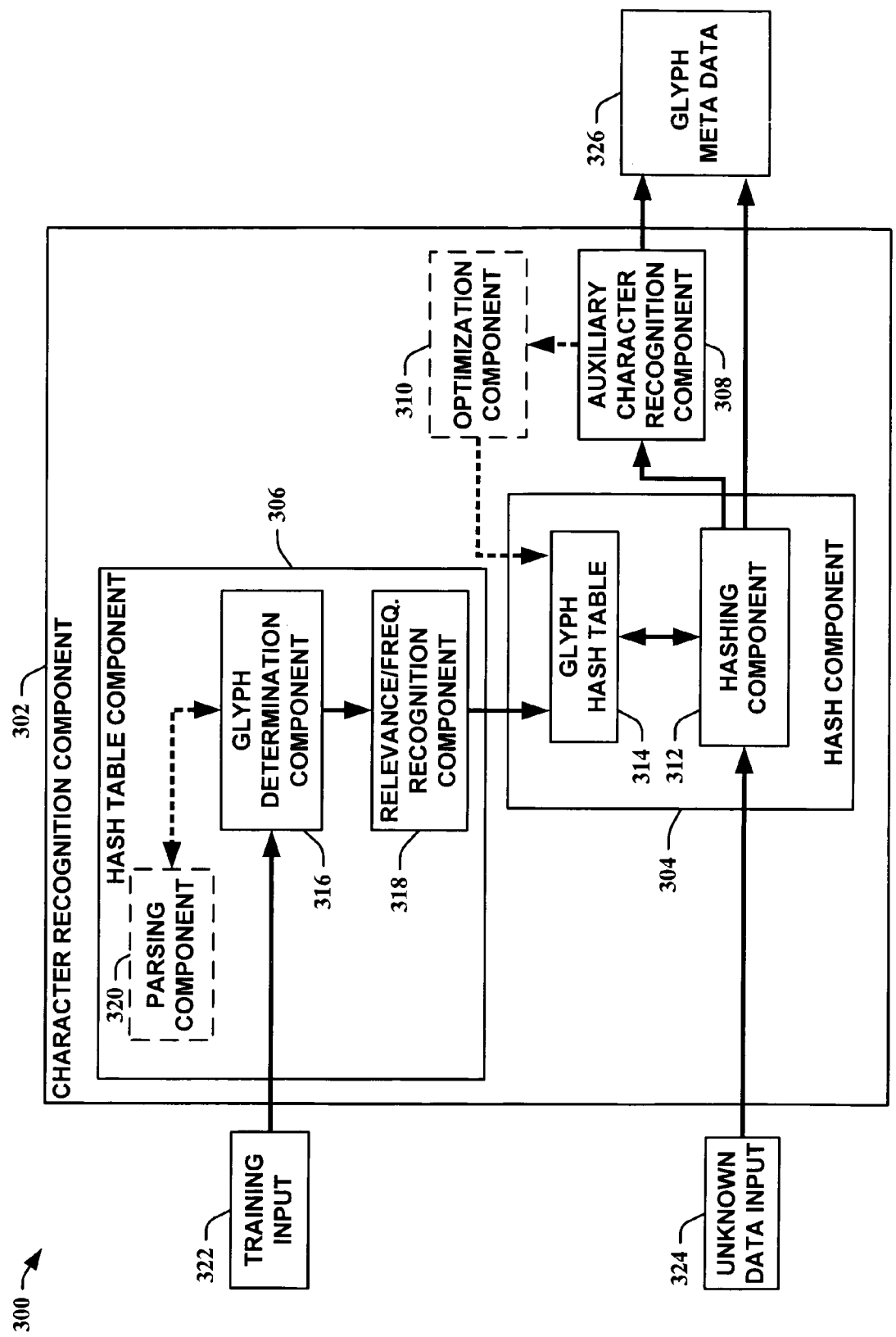
FIG. 3 is yet another block diagram of a character recognition system in accordance with an aspect of the subject invention.

Looking at FIG. 3, yet another block diagram of a character recognition system 300 in accordance with an aspect of the subject invention is illustrated. The character recognition system 300 is comprised of a character recognition component 302 that accepts a training input 322 and an unknown data input 324 and provides glyph meta data 326. The character recognition component 302 is comprised of a hash component 304, a hash table component 306, an auxiliary character recognition component 308, and an optional optimization component 310. The hash component 304 is comprised of a hashing component 312 and a glyph hash table 314. The hash table component 306 is comprised of a glyph determination component 316, a relevance/frequency recognition component 318, and an optional parsing component 320. The training input 322 is received by the glyph determination component 316 and character representations are extracted from it 322. The training input 322 can include compressed, uncompressed, encoded, font programs, and/or other character representations and the like. The optional parsing component 320 provides data parsing functions for the glyph determination component 316 when required. In some cases, automatic data parsing is not possible. In those circumstances, some instances of the subject invention can include a human interface (not illustrated) that provides the parsing via human interaction. Once the glyph representations are identified (i.e., labeled), the relevance/frequency recognition component 318 determines threshold parameters for inclusion of character representations in the glyph hash table 314. The determination for inclusion can include, but is not limited to, frequency of glyph occurrence, frequency of character occurrence, and/or relevancy to a "situation" and the like. Typically, the determination includes parameters to facilitate in the performance of the glyph hash table 314. Generally, the smaller the glyph hash table 314, the higher the performance. Thus, controlling bloating of the glyph hash table 314 enhances its performance. The included representations are then hashed appropriately, and the glyph hash table 314 is then updated.

The hashing component 312 receives the unknown data input 324, hashes it 324, and employs the glyph hash table 314 to facilitate in determining glyph meta data 326. The unknown data input 324 can include compressed, uncompressed, encoded, font programs, and/or other character representations and the like. If hashing component 312 is unable to determine the glyph meta data 326 utilizing the glyph hash table 314, it 312 employs another form of character recognition via the auxiliary character recognition component 308. This can include, but is not limited to, traditional forms of character recognition. Typically, the hashing component 312 cannot determine the glyph meta data 326 when the character representation hash is not found in the glyph hash table 314. Thus, if the auxiliary character recognition component 308 is able to determine the glyph meta data 326, it 308 can also employ the optional optimization component 310 to facilitate in determining if the glyph hash table 314 is to be updated. The optional optimization component 310 can utilize such parameters, for example, as frequency of glyph representation, frequency of character, and/or relevance of glyph representation/character to a "situation," and the like. Thus, even though a representation/character is infrequent overall, it can be extremely relevant in a given situation and, therefore, be included in a glyph hash table update. In other instances of the subject invention, the functionality of the optimization component 310 can also be included within the auxiliary character recognition component 308 and/or the hash component 304.

Figure 4:
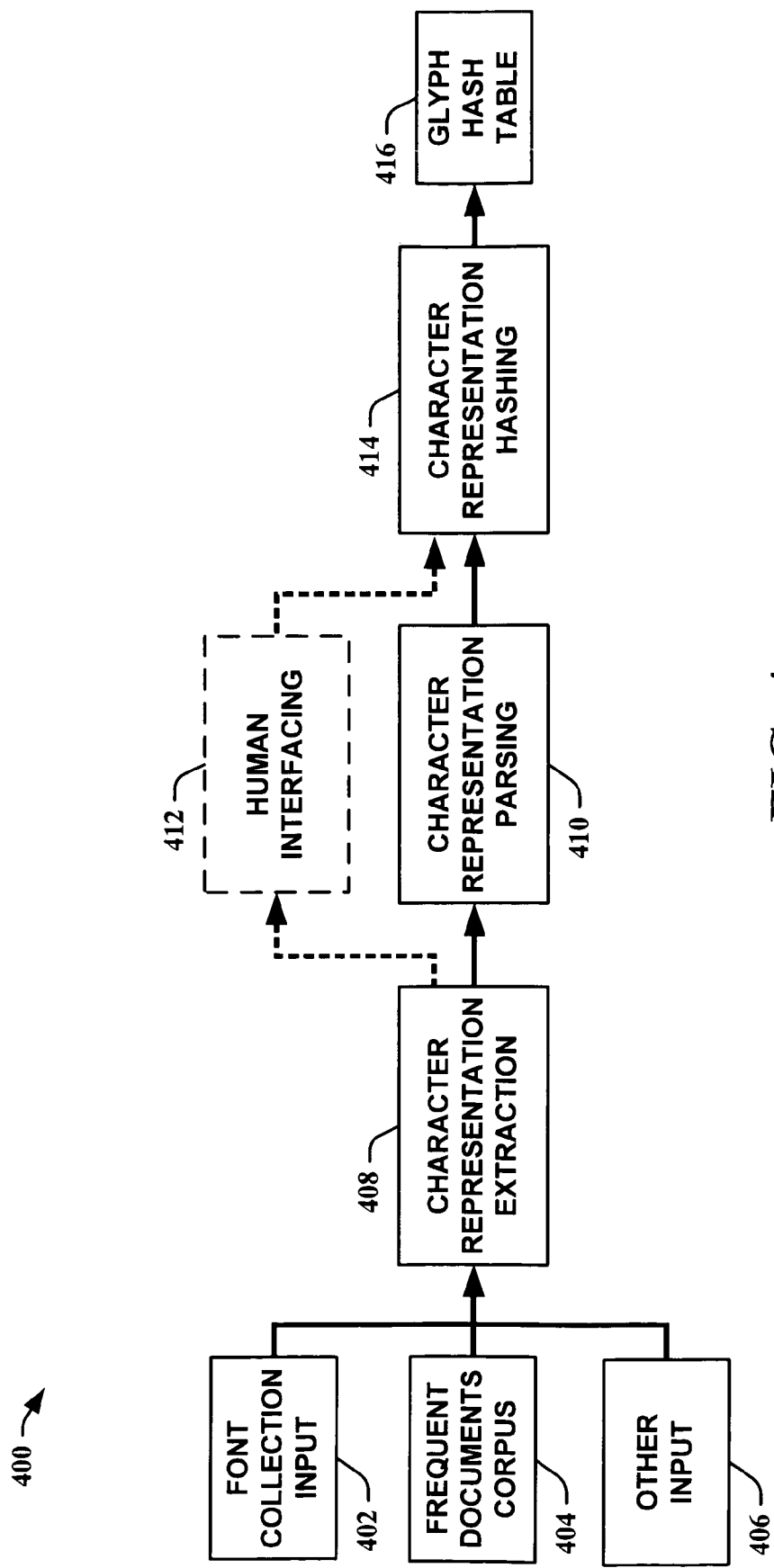
FIG. 4 is a data flow diagram illustrating construction of a glyph hash table in accordance with an aspect of the subject invention.

Turning to FIG. 4, a data flow diagram 400 illustrating construction of a glyph hash table in accordance with an aspect of the subject invention is shown. Typical data that can be received by instances of the subject invention include, for example, a font collection input 402, frequent documents corpus 404, and/or other input 406. From these inputs 402-406, character representations are extracted 408 and then parsed 410 if necessary. The extraction can be accomplished via, for example, a printer driver and/or a display driver and the like. The parsing itself can be accomplished via optional human interfacing 412. This can be necessary if an automatic parsing means cannot parse the extracted character representations. Once the character representations are parsed (if necessary), the representations are then hashed 414. The hashed representations are then utilized to construct a glyph hash table 416. For example, if a frequent document corpus 404 contains portable document formatted (PDF) documents, the font sets for each document are extracted, hashed, and employed to construct the glyph hash table 416. Since instances of the subject invention can receive different types of inputs, the glyph hash table 416 can be influenced by the inputs 402-406. This allows, for example, user-specific, localized, and/or document-specific hash tables and the like to be constructed. These specialized types of hash tables can be employed as a main hash table and/or supplementary to a main or "generic" hash table. Thus, a product utilizing an instance of the subject invention can ship with a generic hash table and later be supplemented via a locally trained hash table. In a similar manner, the generic hash table can be updated and/or supplemented by hash tables that are generated by a separate entity, such as a business service and/or a product enhancement service and the like. This allows business- and/or application-specific hash tables and the like to be utilized by instances of the subject invention.

Figure 5:
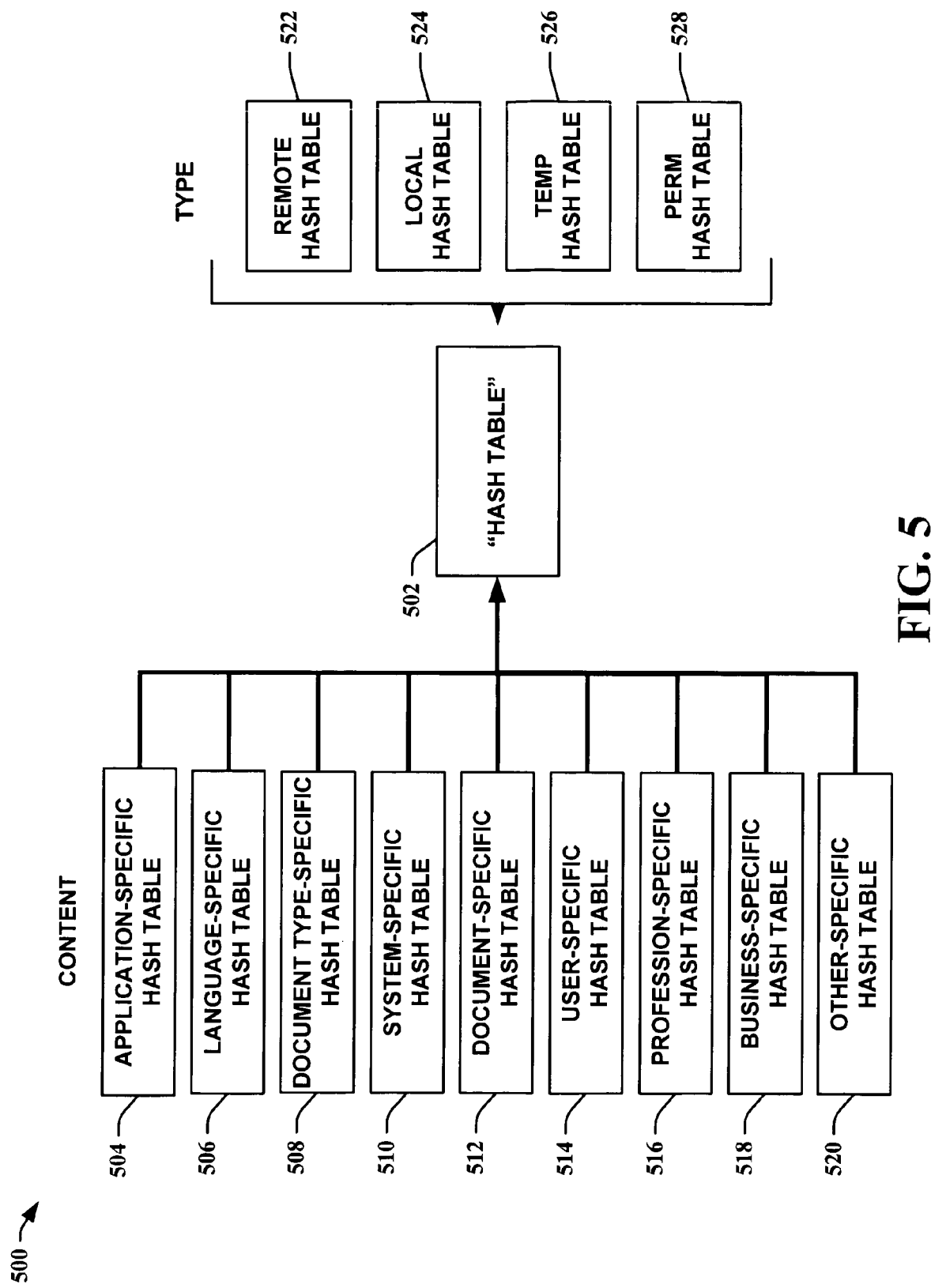
FIG. 5 is an illustration of glyph hash table characteristics in accordance with an aspect of the subject invention.

Moving on to FIG. 5, an illustration of glyph hash table characteristics 500 in accordance with an aspect of the subject invention is depicted. A "hash table" 502 can be comprised of a single table and/or multiple tables such as, for example, an application-specific hash table 504, a language-specific hash table 506, a document type-specific hash table 508, a system-specific hash table 510, a document-specific hash table 512, a user-specific hash table 514, a profession-specific hash table 516, a business-specific hash table 518, and/or other-specific hash table 520. The other-specific hash table 520 can include, for example, specific character sets such as, for example, those utilized for different alphabets. Thus, instances of the subject invention afford substantial flexibility and tailoring to enhance performance of character recognition. The "hash table" 502 itself can reside as a remote hash table 522, a local hash table 524, a temporary hash table 526, and/or a permanent hash table 528 and the like. The "hash table" 502 can have multiple characteristics and residences if it is a 'composite' "hash table" comprising several hash tables. For example, if a user is utilizing a single document, a hash table specific to that document can be created in temporary memory. Thus, for example, the generic hash table can be in permanent memory while the supplemental hash table for the single document can reside in temporary or cache memory.

Hashing Techniques

Data hashing techniques are well known for their utilization with hash tables. Hash tables provide efficient constant time lookup of data (see, Thomas H. Cormen, Charles E. Leiserson, and Ronald L. Rivest; *Introduction to Algorithms* (MIT Electrical Engineering and Computer Science); MIT Press; 1990). Hashing of images in both vector and raster formats has recently gained much attention [see, (Manuel J. Fonseca, B. Barroso, P. Ribeiro, and Joaquim A. Jorge, Retrieving ClipArt Images by Content, International Conference on Image and Video Retrieval (CIVR '04), Dublin, Ireland, July 2004), (Benjamin B. Kimia, Shape Representation for Image Retrieval, in *Image Databases*, Editor(s): Vittorio Castelli, Lawrence D. Bergman, April 2002, John Wiley & Sons), and (E. G. M. Petrakis and C. Faloutsos, Similarity Searching in Large Image Databases, Technical Report 3388, Department of Computer Science, University of Maryland, 1995)]. Schemes for approximate and perfect matching utilizing image hashes have become available and are utilized in the retrieval of images from image databases (see, id.).

Character Recognition

Optical character recognition of print characters is a well studied problem. Print character OCR problems are of two types: Type 1: the character glyphs are identical over independent presentation, and Type 2: the character glyphs are slightly distorted or modified during successive presentations. The second type is well known and is usually what is referred to when one mentions OCR. Common examples include OCR for print and scan images, fax images, and/or digital camera images, etc. Each of these images incurs modifications due to filtering and noise during the acquisition process. As a result, the OCR systems that are successful suffer from the following drawbacks: a) they do not guarantee 100% accuracy (after rejection); b) they are slow (typical systems can process about 1000 characters per second); and c) they do not scale to a large number of fonts, styles, and character sets.

The first class of OCR problems wherein the character glyph is identical over independent presentations offers special potential for overcoming these drawbacks. Furthermore, the utilization of OCR in certain niche applications requires that these drawbacks be overcome for their success. Examples of such applications include OCR in device drivers (print driver, display driver, etc.) where speed is important and the variety of characters is very large.

Instances of the subject invention provide a hashing approach that facilitates in recognition of character glyphs to obtain their character code (for example, Unicode value), font size, font name, and/or font attributes (italics, bold, semi-bold, strikethrough, etc.) and/or any other font and/or character meta data that is of interest. Some instances of the subject invention can process millions of characters per second as opposed to the thousands of characters per second for traditional OCR techniques.

The hashing systems and methods of instances of the subject invention enable one to build a database of hashes which can be utilized for an optimal trade-off between available memory and desired classification accuracy. The systems and methods are (a) very fast with constant time lookup, (b) 100% accurate (after rejection), (c) and can scale, for example, to thousands of fonts, font styles, and/or character sets with, for example, several thousand characters (even to all unique Unicode character glyphs).

Instances of the subject invention take advantage of the fact that when software renders characters to a device (display, print, etc.), the generated characters are identical or have a few limited variations. This facilitates building a very fast OCR based on glyph hashing. Any viable data hashing scheme can be utilized with the subject invention. Examples include Universal Hashing (see, Cormen, Leiserson, and Rivest 1990), Message Digest (MD2, MD4, MD5), and/or Secure Hash (SHA-1, or its 256, 384, and 512 bit variants), etc. [see, respectively, B. Kaliski, RFC 1319—The MD2 Message-Digest Algorithm, RSA Data Security, Inc., April 1992), R. Rivest, RFC 1320—The MD4 Message-Digest Algorithm, MIT Laboratory for Computer Science and RSA Data Security, Inc., April 1992), (R. Rivest, RFC 1321—The MD5 Message-Digest Algorithm, MIT Laboratory for Computer Science and RSA Data Security, Inc., April 1992), and (D. Eastlake, III, and P. Jones, RFC 3174—US Secure Hash Algorithm 1 (SHA1), Motorola (Eastlake) and Cisco Systems (Jones), September 2001)]. Each of these hashing algorithms takes a variable length sequence of bytes and returns a hash value with a fixed number of bits/bytes. This hash is utilized as a unique value of fixed size to represent the character glyph data. Hashes of two glyphs match if the corresponding glyph data also matches. Small changes to the data result in large, unpredictable changes in the hash.

Glyph Hashing

The glyphs can be hashed, for example, based on their contours and/or rasterized bitmaps:

Contour Hashing:

When the contours are hashed, only the control points of the associated Bezier and/or Cardinal splines need to be hashed. Hashing the contours has the following advantages:

Control points for contours are typically independent of font size. Thus, the hash values are independent of font size. This can produce significant space savings and allows for a smaller set of hashes for any font.

Bitmap Hashing:

On the other hand, glyph bitmaps can be directly hashed. This approach has the following advantages:

Since glyph bitmaps are bilevel (black-and-white), they can be compressed either utilizing run-length encoding or by packing several bits per byte of hashed data before being fed to the hashing component.

While most font formats allow access to glyphs in both contour and bitmap formats, some fonts are available only in rasterized formats (aptly called raster fonts).

Raster fonts have different bitmaps for different font sizes. For raster fonts bitmap hashing is the only possible approach.

One skilled in the art can appreciate that other forms of hashing such as, for example, vector quantization of characters, are also within the scope of instances of the subject invention. Thus, glyph hashing of vector data can also be accomplished by rasterizing a select subset of glyphs, e.g., of most common and discriminating ones. Instances of the subject invention also include rasterizing to a color and/or gray-scale bitmap and employing a quantization mechanism to reduce mismatches due to differences in floating point calculations.

Font Detection

When documents are printed/viewed the associated print/display driver gets a font object followed by several characters to be printed/displayed. These characters are identified by associated glyph indices into collections of glyphs present in the font objects. Many document processing applications embed document fonts directly into the document during creation. This allows for these documents to be displayed and printed with visual fidelity even on machines that might not contain fonts utilized in the document. While printing/viewing such documents, the print/display driver gets a temporary ("temp") font object, which is little more than a set of glyphs. The extra meta data might be insufficient to determine the font's name, style, etc. Utilizing a font hash approach provided by an instance of the subject invention, one can hash and lookup each of the glyphs in the temp font. By examining the font information retrieved from the font hash table for these glyphs one can efficiently and with high confidence determine the temp font.

Note that though the mapping from a glyph to the glyph hash (be it in contour or bitmap formats) of instances of the subject invention is one-to-one, the glyph hash to Unicode character and font information, however, is not unique. For example, in the well known Helvetica font the lower case L ('l') and the upper case I ('I') have the same glyphs, and as a result, hash to the same value. Similarly, the underscore character ('') and hyphen character ('-') are identical in several fonts.

These types of "collisions" (i.e., a character having the same glyph representation in different fonts) can oftentimes be resolved utilizing a contextual lookup process. Thus, when hash collisions occur, the character font can still be reliably determined by a hash lookup of the glyphs in the context of the one being considered. The context can be based, for example, on geometrical proximity (e.g., same word or line) and/or on glyphs sharing the same font attributes if such information is available (e.g., in a print driver).

Typical embedded fonts contain anywhere from 20 to 100 or more glyphs. The associated 20-100 or more hashes can be utilized to accurately determine the font. Approaches such as the most frequent font and/or the most frequent character in the document etc. can be utilized to pick one of the identified fonts from these glyphs.

One advantage of utilizing font detection in a device driver based document converter is that although a document might have several thousand or even hundred thousand characters, the number of fonts in the document is relatively small, typically less than 10. Thus, each (temp font, glyph index) pair need only be looked up once and cached to determine every instance of the associated character. Thus, such caching approaches can significantly speedup document conversion.

Building A Glyph Hash Table

A large font hash table can be built utilizing the following procedure:

a) Collect a corpus of frequently utilized/viewed/accessed documents. Most commonly viewed/accessed/printed documents can be obtained through the utilization of internet search engines and/or a web crawler. Note that these documents need not necessarily be in the same format as the document format being targeted for import. Glyphs from fonts will have the same structure independent of which document format they come from.

b) Through a print/display driver extract all temp fonts and associated glyph bitmaps/contours from these documents. A program that can view/print these documents is sufficient.

c) Label these glyphs either utilizing an available parser (that can parse for character/font information). In many cases a parser is much simpler than the associated document authoring/viewing software. Also, one need only be able to parse for characters present in the document.

d) Compute bitmap/contour hashes for these labeled glyphs and build a glyph hash table.

In step a), instead of a corpus of documents, a large collection of fonts can also be utilized.

Building A Rasterized Glyph Hash Table

In certain cases, a parser might only be able to provide information regarding where a particular character/word is rendered to on the printer page/display screen. In such scenarios, one can utilize an image as a print or display target to capture the rasterized data. Unfortunately, the rasterized output will contain a flattened version of the glyph data from all characters and objects on the page. The glyphs will be modified when they touch or overlap other objects. Further, the document viewing/printing tool might utilize a custom rasterizer that might implement advanced font rendering features such as anti-aliasing, text hinting, type rendering, etc. The rendered image can be segmented utilizing character/word location information to obtain rasterized character bitmaps. The extracted character bitmap will not necessarily be unique, especially when background images, texture, or document stationery is utilized. Further, if sub-pixel smoothing and/or anti-aliasing approaches are utilized, several possible rasterizations might be possible for the same character. These can cause the glyph hash table to bloat. However, the rasterized glyph hash table can still be very useful. If all else fails or if a parser is not available, connected components can be extracted from the image and labeled by a person.

Implementation in a Print Driver

The font hashing, font detection, and glyph hash caching approaches described supra can be implemented as part of a print driver as well.

Pruning the Glyph Hash Table

It is possible that on certain systems having a very large glyph hash table might not be possible. Examples include mobile devices, hand held devices, very low end and/or embedded systems. One needs to trade-off memory/disk space utilized with the likelihood of finding characters in the glyph hash table. One can utilize character occurrence frequency to remove those glyphs that occur less frequently or rarely. If the glyph hash table was built utilizing a large corpus of frequently utilized/viewed/accessed documents (as described supra), the distribution frequencies of the hashed characters would be a good indicator of which glyph hashes to keep and which ones to discard. For example, if only N hashes can be retained, one can sort all collected hashes in decreasing order of their frequency of occurrence and pick the first N. The selection of glyphs in the hash can also consist of glyphs that either represent common characters, or are discriminating for the font, or a combination of both.

Utilization with Traditional OCR

The font hash lookup is only as useful as the size, variety, and/or applicability of the glyphs contained in the font hash table. Due to the finite nature of the font hash table, it is possible for a glyph hash lookup to fail. In such scenarios, a traditional OCR system (which can be substantially slower) can be utilized to obtain partial information.

Instances of the subject invention also apply to any combination of character and font recognition, in particular, recognizing the font utilized for a set of characters, without necessarily recognizing all character values in the set. This is important for repurposing, where it may be easy to recognize character values by means of traditional OCR, but the step of font recognition is still essential for the fidelity of the repurposed version. Thus, instances of the subject invention facilitate in these types of combination processing by providing an efficient and accurate means to determine font recognition.

Figure 6:
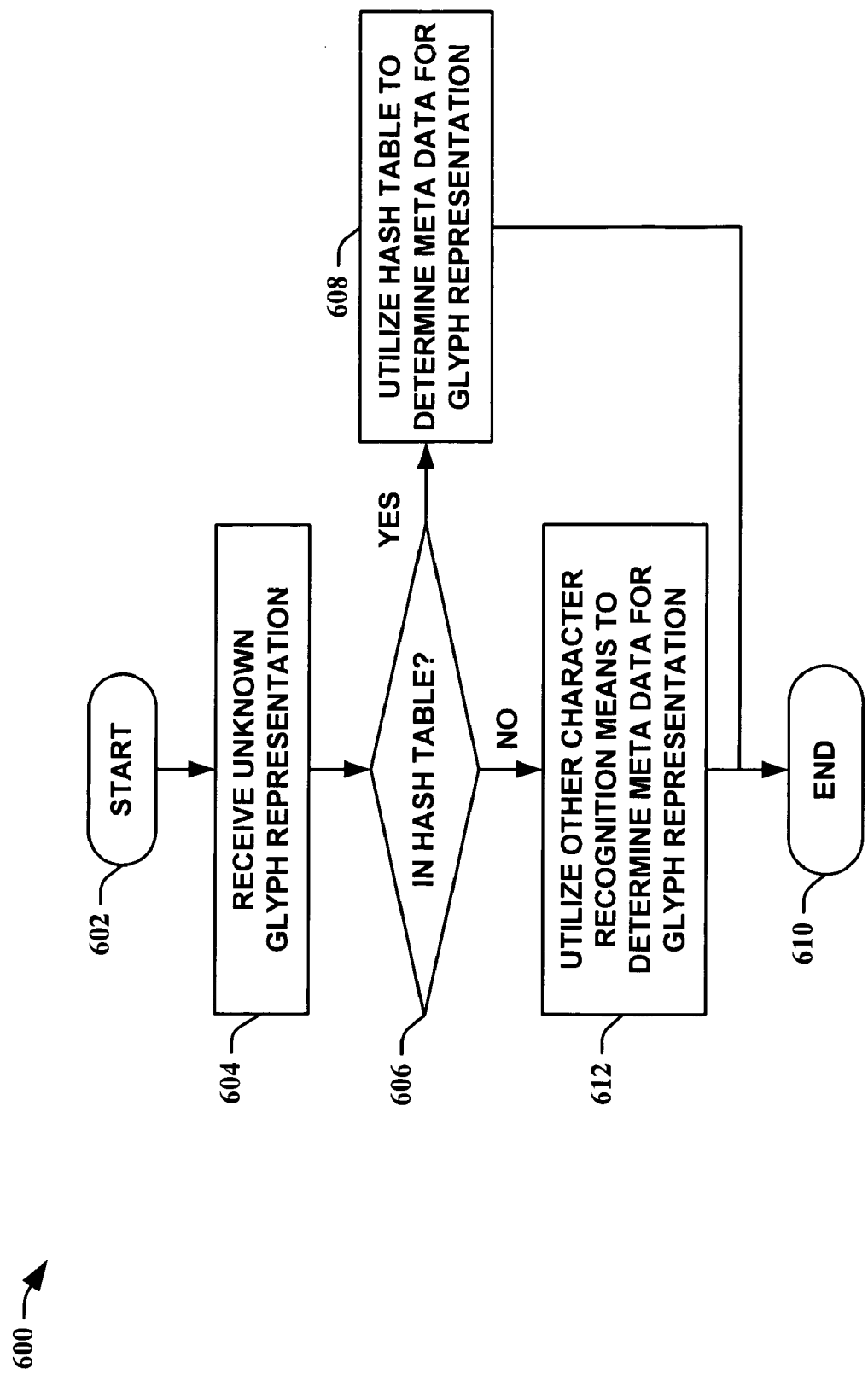
FIG. 6 is a flow diagram of a method of facilitating character recognition in accordance with an aspect of the subject invention.
Figure 7:
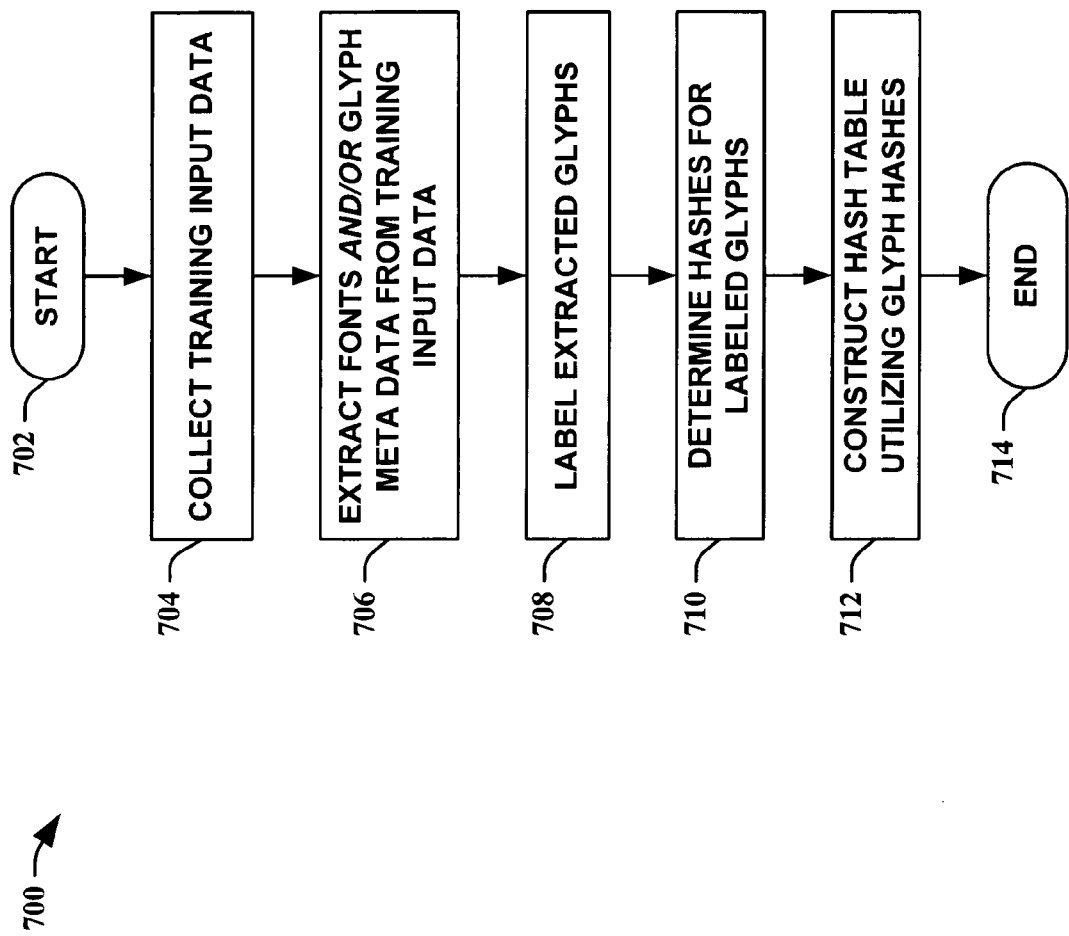
FIG. 7 is a flow diagram of a method of constructing a glyph hash table in accordance with an aspect of the subject invention.
Figure 8:
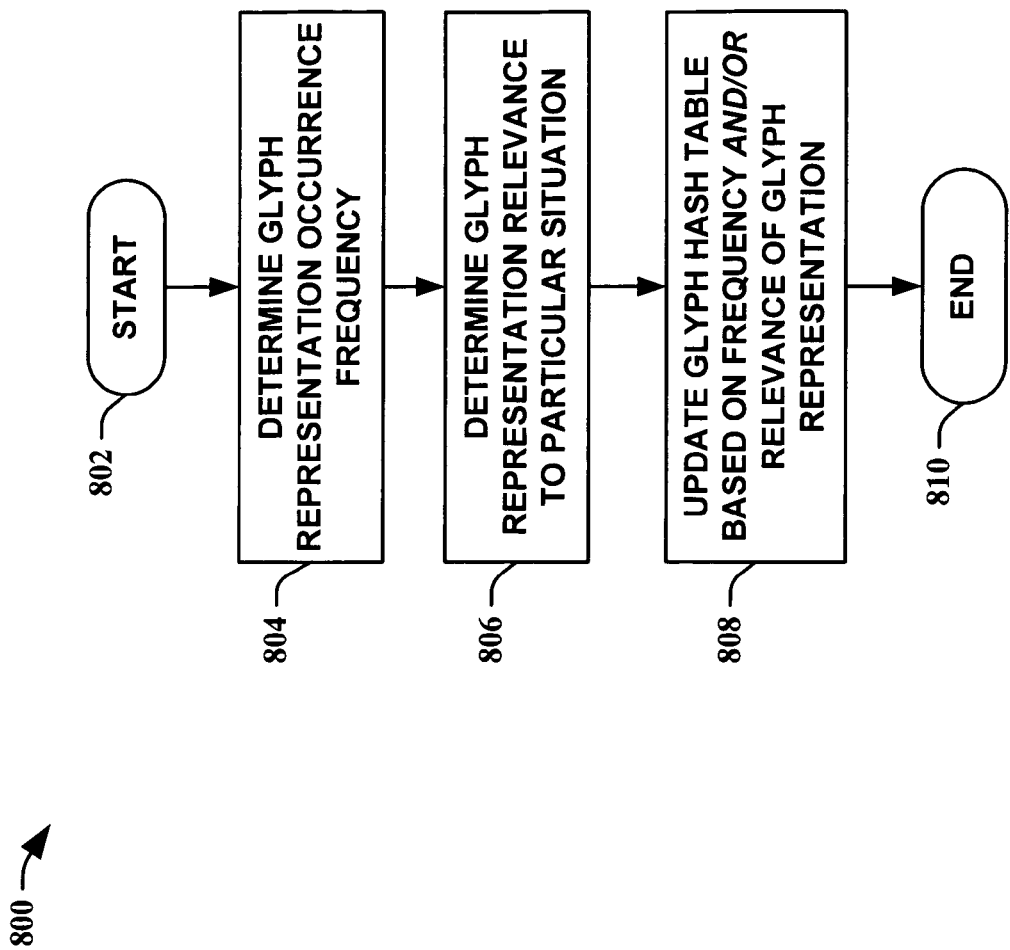
FIG. 8 is a flow diagram of a method of updating a glyph hash table in accordance with an aspect of the subject invention.

In view of the exemplary systems shown and described above, methodologies that may be implemented in accordance with the subject invention will be better appreciated with reference to the flow charts of FIGS. 6-8. While, for purposes of simplicity of explanation, the methodologies are shown and described as a series of blocks, it is to be understood and appreciated that the subject invention is not limited by the order of the blocks, as some blocks may, in accordance with the subject invention, occur in different orders and/or concurrently with other blocks from that shown and described herein. Moreover, not all illustrated blocks may be required to implement the methodologies in accordance with the subject invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the subject invention.

In FIG. 6, a flow diagram of a method 600 of facilitating character recognition in accordance with an aspect of the subject invention is shown. The method 600 starts 602 by receiving an unknown glyph representation 604. A determination is then made as to whether the glyph representation is in a hash table of glyph representations 606. If the glyph representation is found in the hash table, the hash table information is utilized to determine glyph meta data for the glyph representation 608, ending the flow 610. If the glyph representation is not found in the hash table, other means of character recognition are employed to determine the glyph meta data 612, ending the flow 610. Thus, instances of the subject invention facilitate to substantially enhance the performance of traditional and/or other character recognition means by providing a substantially faster pre-filtering means to determine glyph meta data. By utilizing the hash table, a 100% character recognition rate can be achieved at a substantial processing cost reduction. In other instances of the subject invention, glyph meta data determined by the other recognition means can be re-introduced into the hash table to allow it to be updated per some determined criteria.

Still yet other instances of the subject invention include methods of recognizing a font utilized for a set of characters, without necessarily recognizing all character values in the set. A traditional means of OCR can be employed to recognize the character values while hash tables are utilized to provide font recognition. Thus, instances of the subject invention provide flexibility in the utilization of an auxiliary recognition process as a post processing means and/or a preprocessing means.

Referring to FIG. 7, a flow diagram of a method 700 of constructing a glyph hash table in accordance with an aspect of the subject invention is depicted. The method 700 starts 702 by collecting training input data 704. Meta data is then extracted from fonts and/or glyphs in the training data 706. The extracted glyphs are then labeled 708 and the glyph data is then hashed 710. The glyph hashes are then utilized to construct a glyph hash table 712, ending the flow 714. In this manner, instances of the subject invention can be trained to increase performance for various "situations." Thus, the hash table can be influenced based upon the type of training data. This allows instances to provide specific hash tables elaborated supra as well as generic hash tables.

Looking at FIG. 8, a flow diagram of a method 800 of updating a glyph hash table in accordance with an aspect of the subject invention is illustrated. The method 800 starts 802 by determining a frequency of occurrence of a glyph representation for a given input 804. Relevance to a particular "situation" is then determined for the glyph representation 806. A glyph hash table is then updated based on frequency and/or relevance of the glyph representation 808, ending the flow 810. In this manner, instances of the subject invention can tailor a hash table to increase performance based on particular "situations" elaborated upon supra. For example, in one instance of the subject invention, a document-specific hash table can be created for a 100 page document that might include one paragraph of Chinese characters. The frequency of the Chinese characters for that single document can be too low to trigger a frequency threshold to update the document-specific hash table. However, a user can have a document set that is entirely in Chinese except for that single document. Thus, although the document-specific hash table would not be updated in this example, a user-specific hash table, for example, can be updated to facilitate character recognition for the document set. Thus, the updating can be based, for example, on frequency to the specific document and/or a document set and the like. It can also be based on relevance such that knowledge that Chinese characters will become frequent can be utilized to update a hash table for a particular genre of documents that might be accessed in the future. In this manner a specific hash table for Chinese characters can be constructed before it needs to be utilized for Chinese character based documents. The flexibility afforded by instances of the subject invention allows it to be employed for many types of documents in various types of situations.

Figure 9:
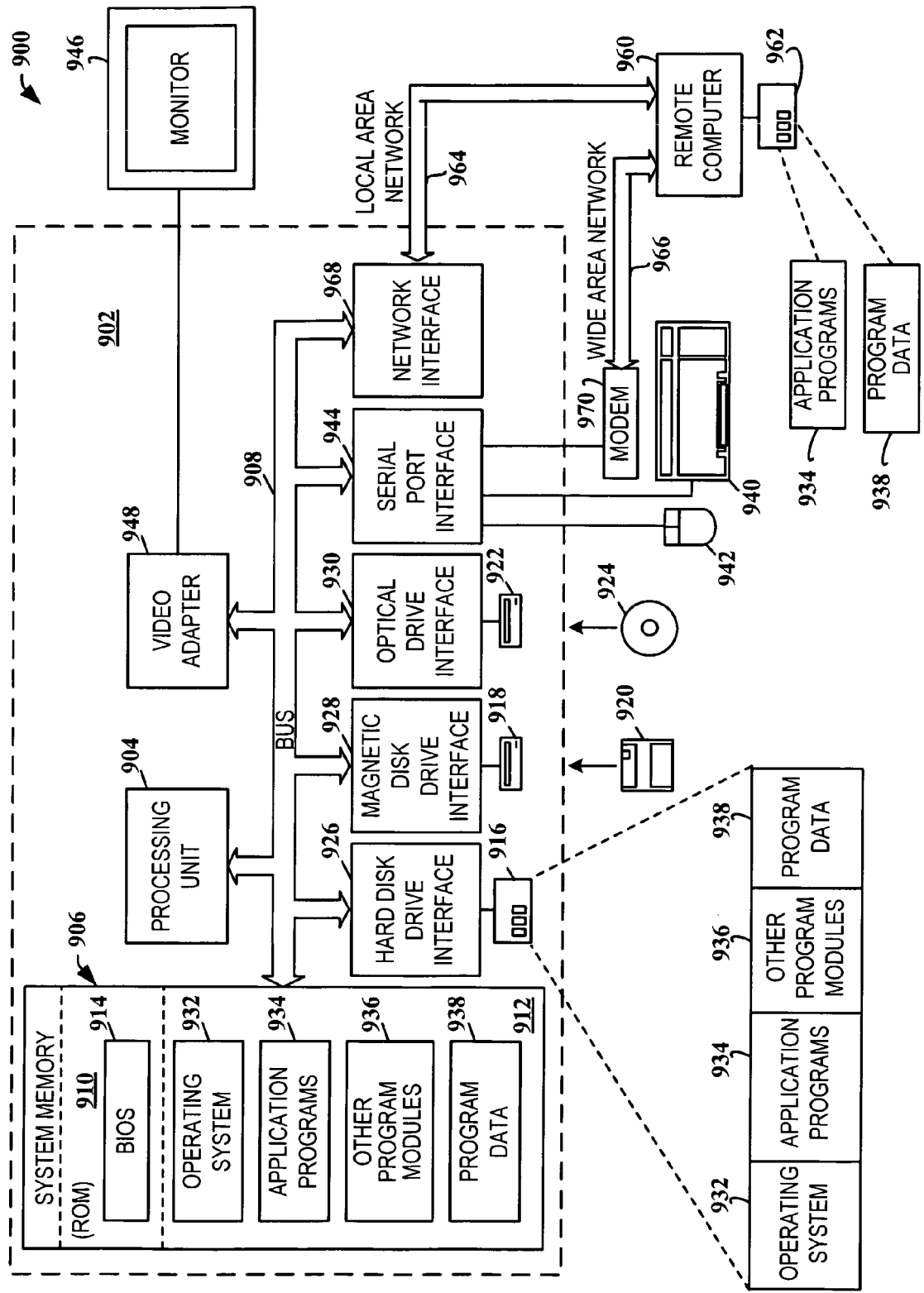
FIG. 9 illustrates an example operating environment in which the subject invention can function.

In order to provide additional context for implementing various aspects of the subject invention, FIG. 9 and the following discussion is intended to provide a brief, general description of a suitable computing environment 900 in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As utilized in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 9, an exemplary system environment 900 for implementing the various aspects of the invention includes a conventional computer 902, including a processing unit 904, a system memory 906, and a system bus 908 that couples various system components, including the system memory, to the processing unit 904. The processing unit 904 may be any commercially available or proprietary processor. In addition, the processing unit may be implemented as multi-processor formed of more than one processor, such as may be connected in parallel.

The system bus 908 may be any of several types of bus structure including a memory bus or memory controller, a peripheral bus, and a local bus utilizing any of a variety of conventional bus architectures such as PCI, VESA, Microchannel, ISA, and EISA, to name a few. The system memory 906 includes read only memory (ROM) 910 and random access memory (RAM) 912. A basic input/output system (BIOS) 914, containing the basic routines that help to transfer information between elements within the computer 902, such as during start-up, is stored in ROM 910.

The computer 902 also may include, for example, a hard disk drive 916, a magnetic disk drive 918, e.g., to read from or write to a removable disk 920, and an optical disk drive 922, e.g., for reading from or writing to a CD-ROM disk 924 or other optical media. The hard disk drive 916, magnetic disk drive 918, and optical disk drive 922 are connected to the system bus 908 by a hard disk drive interface 926, a magnetic disk drive interface 928, and an optical drive interface 930, respectively. The drives 916-922 and their associated computer-readable media provide nonvolatile storage of data, data structures, computer-executable instructions, etc. for the computer 902. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be utilized in the exemplary operating environment 900, and further that any such media may contain computer-executable instructions for performing the methods of the subject invention.

A number of program modules may be stored in the drives 916-922 and RAM 912, including an operating system 932, one or more application programs 934, other program modules 936, and program data 938. The operating system 932 may be any suitable operating system or combination of operating systems. By way of example, the application programs 934 and program modules 936 can include a data recognition scheme in accordance with an aspect of the subject invention.

A user can enter commands and information into the computer 902 through one or more user input devices, such as a keyboard 940 and a pointing device (e.g., a mouse 942). Other input devices (not shown) may include a microphone, a joystick, a game pad, a satellite dish, a wireless remote, a scanner, or the like. These and other input devices are often connected to the processing unit 904 through a serial port interface 944 that is coupled to the system bus 908, but may be connected by other interfaces, such as a parallel port, a game port or a universal serial bus (USB). A monitor 946 or other type of display device is also connected to the system bus 908 via an interface, such as a video adapter 948. In addition to the monitor 946, the computer 902 may include other peripheral output devices (not shown), such as speakers, printers, etc.

It is to be appreciated that the computer 902 can operate in a networked environment utilizing logical connections to one or more remote computers 960. The remote computer 960 may be a workstation, a server computer, a router, a peer device or other common network node, and typically includes many or all of the elements described relative to the computer 902, although for purposes of brevity, only a memory storage device 962 is illustrated in FIG. 9. The logical connections depicted in FIG. 9 can include a local area network (LAN) 964 and a wide area network (WAN) 966. Such networking environments are commonplace in offices, enterprise-wide computer networks, intranets and the Internet.

When utilized in a LAN networking environment, for example, the computer 902 is connected to the local network 964 through a network interface or adapter 968. When utilized in a WAN networking environment, the computer 902 typically includes a modem (e.g., telephone, DSL, cable, etc.) 970, or is connected to a communications server on the LAN, or has other means for establishing communications over the WAN 966, such as the Internet. The modem 970, which can be internal or external relative to the computer 902, is connected to the system bus 908 via the serial port interface 944. In a networked environment, program modules (including application programs 934) and/or program data 938 can be stored in the remote memory storage device 962. It will be appreciated that the network connections shown are exemplary and other means (e.g., wired or wireless) of establishing a communications link between the computers 902 and 960 can be utilized when carrying out an aspect of the subject invention.

In accordance with the practices of persons skilled in the art of computer programming, the subject invention has been described with reference to acts and symbolic representations of operations that are performed by a computer, such as the computer 902 or remote computer 960, unless otherwise indicated. Such acts and operations are sometimes referred to as being computer-executed. It will be appreciated that the acts and symbolically represented operations include the manipulation by the processing unit 904 of electrical signals representing data bits which causes a resulting transformation or reduction of the electrical signal representation, and the maintenance of data bits at memory locations in the memory system (including the system memory 906, hard drive 916, floppy disks 920, CD-ROM 924, and remote memory 962) to thereby reconfigure or otherwise alter the computer system's operation, as well as other processing of signals. The memory locations where such data bits are maintained are physical locations that have particular electrical, magnetic, or optical properties corresponding to the data bits.

Figure 10:
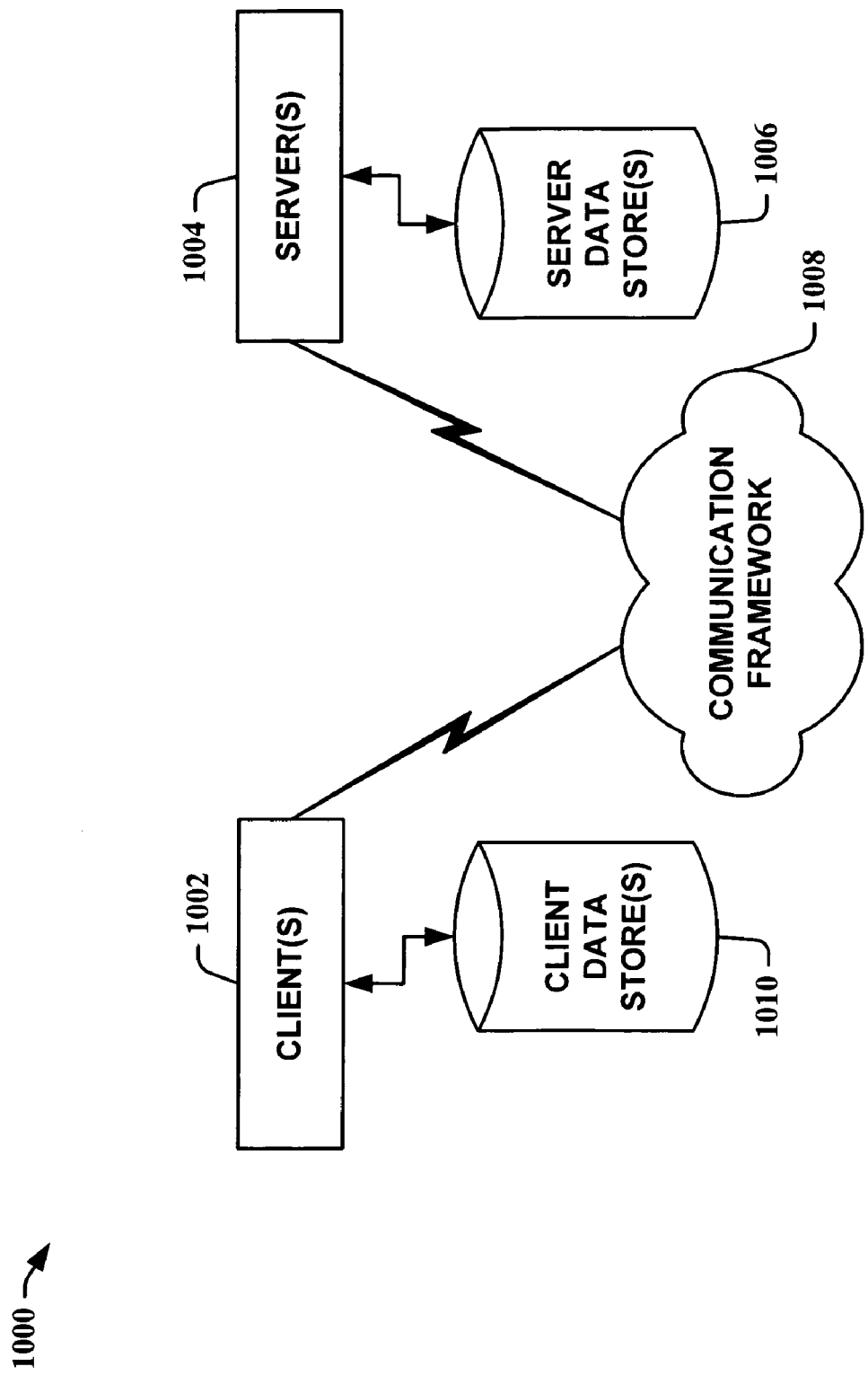
FIG. 10 illustrates another example operating environment in which the subject invention can function.

FIG. 10 is another block diagram of a sample computing environment 1000 with which the subject invention can interact. The system 1000 further illustrates a system that includes one or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). One possible communication between a client 1002 and a server 1004 may be in the form of a data packet adapted to be transmitted between two or more computer processes. The system 1000 includes a communication framework 1008 that can be employed to facilitate communications between the client(s) 1002 and the server(s) 1004. The client(s) 1002 are connected to one or more client data store(s) 1010 that can be employed to store information local to the client(s) 1002. Similarly, the server(s) 1004 are connected to one or more server data store(s) 1006 that can be employed to store information local to the server(s) 1004.

It is to be appreciated that the systems and/or methods of the subject invention can be utilized in data recognition facilitating computer components and non-computer related components alike. Further, those skilled in the art will recognize that the systems and/or methods of the subject invention are employable in a vast array of electronic related technologies, including, but not limited to, computers, servers and/or handheld electronic devices, and the like.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is utilized in either the detailed description or the claims, such term is intended to be inclusive in a manner similar to the term "comprising" as "comprising" is interpreted when employed as a transitional word in a claim.

What is claimed is:

1. A system that facilitates data recognition comprising:
   a processor coupled to a memory, the processor executing:
   a hash component that receives an input with at least one representation of an unknown character glyph and attempts to determine meta data associated with the glyph via at least one hash table;
   a hash table component that receives training data, wherein the training data comprises documents, fonts, and glyph information, including glyph appearance frequency;
   the hash table component formulates the hash table á posteriori based on the training data and via hashing a glyph meta data derived from the training data, wherein the hash table is utilized to identify a print character where the character glyph is identical over an independent presentation, the hash table is updated based on a threshold value; and
   an auxiliary character recognition component that is utilized as a secondary form of character recognition to supplement the hash component in determining the glyph meta data, the auxiliary character recognition component is utilized as an alternative to utilizing the hash component if the hash component fails to identify the glyph meta data.

2. The system of claim 1, the unknown glyph representation comprising uncompressed, compressed, and encoded representations.

3. The system of claim 1 further comprising:
   a component that updates the hash table with meta data determined by the auxiliary character recognition component.

4. The system of claim 1 further comprising:
   an optimization component that utilizes, at least in part, glyph and character frequency to optimize the hash table.

5. The system of claim 1, the hash table component further comprising:
   a parsing component that parses extracted information obtained from the training data to facilitate in determining glyph meta data when required.

6. The system of claim 1, the hash table resides locally and/or remotely from the system.

7. The system of claim 1, the hash table comprising a temporary hash table, a permanent hash table, a document-specific hash table, a user-specific hash table, a document type-specific hash table, a computing system-specific hash table, a location-specific hash table, a language-specific hash table, a business-specific hash table, an application-specific hash table, a character set-specific hash table, and/or a profession-specific hash table.

8. The system of claim 1, the hash table provides alternative attributes as meta data to facilitate in determination of ambiguous glyphs.

9. A method for facilitating data recognition, comprising:
   employing a processor to execute the data recognition, comprising:
   receiving an input with at least one representation of an unknown glyph;
   receiving training data and formulating a hash table á posteriori based on the training data and via hashing glyph meta data derived from the training data, wherein the training data comprises documents, fonts, and glyph information, including glyph appearance frequency;
   querying the hash table to facilitate in determining meta data for the unknown glyph, the hash table providing unique one-to-one glyph to glyph hash mapping, wherein the hash table is utilized to identify a print character where the unknown glyph is identical over an independent presentation;
   utilizing a secondary form of character recognition to supplement the hash table query in determining the meta data for the unknown glyph when necessary the secondary form is utilized as an alternative to utilizing the hash table when the hash table fails to determine the meta data for the unknown glyph; and
   updating the hash table when a predetermined threshold value, based on a criteria of glyph representation, is reached, the predetermined threshold value comprising at least one of frequency or relevance of the glyph representation.

10. The method of claim 9 further comprising:
    employing the other form of character recognition to determine character values; and
    utilizing the hash table query to facilitate in font recognition of the determined character values.

11. The method of claim 9 further comprising:
    sampling glyphs from a training input including unknown glyphs;
    associating labels to the unknown glyphs; and
    constructing the hash table from the unknown glyphs.

12. The method of claim 11 further comprising:
employing environmental, usage, and/or user related information to facilitate in construction of the hash table.

13. The method of claim 11, the training input comprising at least one document and at least one font.

14. The method of claim 11 further comprising:
pruning the hash table based upon situational relevance of a glyph, frequency of a glyph appearance, and frequency of a character in the training input.

15. The method of claim 9 further comprising:
utilizing, at least in part, the other form of character recognition to facilitate in updating the hash table.

16. The method of claim 9, the hash table comprising a rasterized glyph hash table.

17. A print and display driver utilizing the method of claim 9.

18. A system that facilitates data recognition, comprising:
a processor coupled to a memory, the processor configured to act as:
means for receiving an input with at least one representation of an unknown glyph;
means for receiving training data and formulating at least one hash table á posteriori based on the training data and via hashing glyph meta data derived from the training data, wherein the training data comprises documents, fonts, and glyph information, including glyph appearance frequency;
means for attempting to determine meta data associated with the glyph via the at least one hash table;
means for employing a secondary character recognition means to supplement the meta data determination as an alternative when the at least one hash table fails to determine the meta data associated with the glyph; and
means for updating the hash table with the meta data determined by the secondary character recognition means when a predetermined threshold value is reached.

* * * * *